T. B. HUNTER.
APPARATUS FOR CAP STEMMING RAISINS.
APPLICATION FILED NOV. 22, 1920.
1,393,287.
Patented Oct. 11, 1921.
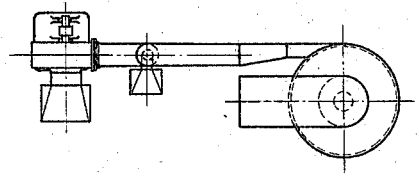
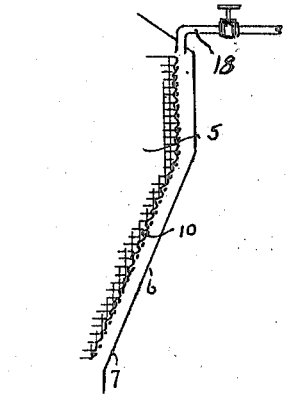
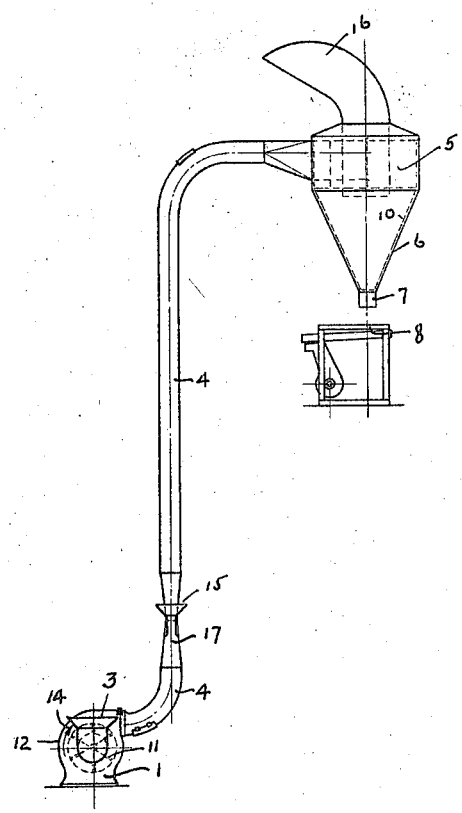
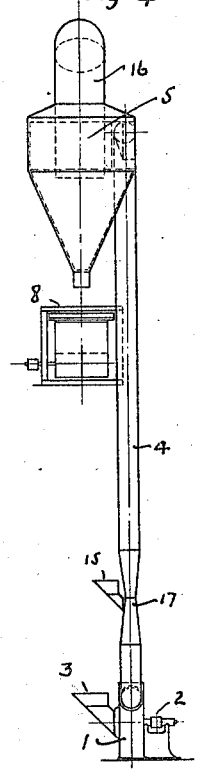
INVENTOR
Thomas B Hunter
BY
Miller &
ATTORNEYS

UNITED STATES PATENT OFFICE.

THOMAS B. HUNTER, OF SAN FRANCISCO, CALIFORNIA.

APPARATUS FOR CAP-STEMMING RAISINS.

1,393,287. Specification of Letters Patent. Patented Oct. 11, 1921.

Application filed November 22, 1920. Serial No. 425,593.

*To all whom it may concern:*

Be it known that I, THOMAS B. HUNTER, a citizen of the United States, and a resident of the city and county of San Francisco, State of California, have invented a new and useful Apparatus for Cap-Stemming Raisins.

In cap-stemming devices heretofore the mechanical abrasion of one raisin against another or against the parts of the machine, not infrequently results in the breaking of the raisin followed by the exudation of the sticky contents which permeates the mass of raisins causing them to accumulate in a congested mass, making difficult the proper subsequent operations and frequently spoiling large quantities.

In my invention the raisins are not massed together in frictional contact under pressure between parts of a machine, but are in frictional contact with but one part of the machine at one time and free on their other surface, so that any bursting or breaking pressure of the raisin skin is at all times avoided. On the other hand the raisin is rolled or rubbed in frictional contact with one surface and at a pressure directly proportional to its individual mass and velocity of movement, the object being to quickly separate the cap stem without damage to the raisin.

Another object of my invention is the rapidity with which the operation is performed and consequently the large capacity of my device for the handling of raisins compared with methods and apparatus heretofore used.

Another object is the simple and efficient separation of the cap stemmed raisins from the removed stems.

Other objects will appear in the specification and drawings. These objects I attain by:

Passing the raisins through a device in which they are given a rapid circular motion, as for example, the well-known centrifugal fan, the blades of which may be properly shaped for receiving the raisins with the least impact, or into a body of air or the like and in a suitable channel where they are given such motion. They are caught up and caused to travel in a circular path whereby they acquire centrifugal force and upon leaving the said circular path, are caused to travel in straight paths and against a receiving surface, as the interior shell of the casing, and I prefer to form the angle of the fan blades and the speed at which the fan blades travel such that the resultant direction after leaving the fan blades or other path, will be such that the raisin approaches the receiving surface at an angle. It will then have a resultant velocity along said receiving surface and will thereby be caused to roll upon the said receiving surface and against other raisins with which it may contact. The cap stem will under the desired action be broken off and by the application of just sufficient force and without danger of damaging the raisin skin. The path followed by the raisin after its travel on the receiving surface, may advantageously be through an air duct and they may be carried through said air duct by the current of air from the fan to any desired elevation and then received on a collector surface, preferably at an angle so that the velocity which they have attained will again cause abrasive action between the raisins and the receiving surface of the said collector or separator. The collector is preferably made of relatively large capacity so that the air velocity which has heretofore been employed in conveying the raisins, will be greatly reduced so that the raisins travel to the bottom of said collector and be suitably removed as through its tapering or funnel bottom and the air be conveyed off through another suitable outlet. In this way the raisins may be cleaned from the stems by passing through suitable gratings and if required simultaneously graded.

By referring to the accompanying drawings my invention will be made clear.

Throughout the figures the same numerals refer to identical parts.

Figure 1 is a side view of the apparatus of my invention arranged also for transferring the raisins from one floor to another between a blower and separator.

Fig. 2 is a right angle view of Fig. 1.

Fig. 3 is a plan view of Fig. 1.

Fig. 4 is a detail section of part of the separator of Fig. 1.

A centrifugal fan similar to that employed for the blowing of air is indicated by the numeral 1, and this is provided with a suitable driving pulley at 2, by which it is to be operated from a power source, not shown but well known. A receiving hopper 3 is fixed to the inlet of the fan and a connecting duct 4 to the outlet. This I have shown also as an elevator and conveyer for the raisins between one floor and another, although it is to be understood that it may be arranged so as to convey the raisins to any required point, either on the same or different floors. This duct 4 feeds into the separator 5, preferably made in circular form, substantially at a tangent to said separator. The lower portion of the separator is constructed with a funnel bottom as at 6 down which the raisins travel to the spout 7 and thence on to the screening or grading table 8. The air which has been used with the raisins rises and passes off through the delivery spout 16.

Upon the interior walls of the separator 5 may be advantageously located a corrugated surface or a piece of wire screen as indicated at 10 (see also Fig. 4). This forms a sufficient retardation to the moving raisins to break away the most resistant cap stems. It is to be understood that the fan blades shown in dotted lines 11 rotate within the casing 12 of the fan at a distance therefrom much greater than the diameter of the raisins and I have found two to three inches, or even more, to be a suitable distance. This is so that there will be no rubbing of the raisins between two surfaces and so that the raisins will be rolling or sliding, or both, across but one surface at a time, although, of course each raisin will be frequently contacting with other raisins. The operation is as follows:

The raisins in suitable condition for cap stemming are delivered to the hopper 3 and thence travel into the center of the fan and are caught upon the rotating fan blades 11 and forced thereby in the direction of the arrow 14, thence traveling by centrifugal force and against the wall 12 of the fan casing, the spiral movement of the column of air within the fan combined with their kinetic energy causes their travel out of the fan casing into the duct 4, and thence to the separator 5. They are received in the separator 5 at substantially a tangent to the walls of the said separator and still traveling with the air currents follow a path along the wall 10, tumbling against each other and rolling against the surface of the said wall and freeing the cap stems, falling thereafter to the bottom 6 of the separator. Due to the larger volume of the separator 5 the air velocities will diminish within the said separator, to a degree insufficient to carry the raisins and for this reason the raisins will fall into the bottom 6 and the air leave freely through the top outlet 16. The raisins now falling upon the screen table 8 are separated in the well known way from their already freed cap stems. Or the raisins may be fed into the rising air column through the chute 15 in which case they are freed from their cap stems in the separator 5 as above described. In this case I prefer to converge the duct 4 to a throat 17 within which the air column is traveling at an increased speed.

In either case the raisins are while traveling separately and at a high velocity received upon a surface over which they are rolled and the capstems freed thereby and I desire to be understood as claiming all such variations.

It will be noted that between the screen 10 and the walls of the separator 5 (Fig. 4) I have shown a free space which I prefer to make sufficient for the capstems to collect therein when they separate from the raisins, the mesh of the screen being sufficient for the stems to pass through but to retain the raisins. At 18 I have shown steam pipes for cleaning the said space.

I claim:

1. Apparatus for cap stemming raisins and the like, comprising a duct constructed and adapted to receive raisins therein, means for forcing air and raisins through said duct, a receptacle of relatively large capacity into which the duct is adapted to discharge the air and raisins, and a surface over which the raisins are forced whereby the capstems are separated from the raisins.

2. Apparatus as set forth in claim 1 wherein the means for forcing air through the duct consists of a fan and wherein the means for introducing the raisins into the duct consists of a hopper between the pan and the receptacle and wherein the duct is contracted where the raisins are fed therein.

3. Apparatus as set forth in claim 1 wherein the air is forced into the duct by a fan and wherein the means whereby the raisins are introduced into the duct comprises a hopper at the air inlet of the fan whereby the raisins are received and conveyed by the fan blades and casing and thence to the duct.

4. Apparatus for cap stemming raisins comprising a receptacle of circular horizontal cross section and of funnel shaped bottom having an outlet therein, a screen disposed against an inner imperforate wall, and means for introducing a current of air containing raisins in transit within said screen and in a substantially tangential direction whereby the raisins are caused to roll upon the said screen.

5. Apparatus as set forth in claim 4 wherein the screen is spaced from the circular wall and in combination therewith steam inlet means constructed and adapted for cleaning the screen and said wall.

THOMAS B. HUNTER.